May 11, 1937. R. CHILTON 2,079,679
TRANSMISSION
Filed May 29, 1934 5 Sheets-Sheet 1

Fig.1.

INVENTOR
ROLAND CHILTON
BY
ATTORNEY

May 11, 1937. R. CHILTON 2,079,679
TRANSMISSION
Filed May 29, 1934  5 Sheets-Sheet 4

INVENTOR
ROLAND CHILTON
BY
ATTORNEY

May 11, 1937.　　　　R. CHILTON　　　　2,079,679
TRANSMISSION
Filed May 29, 1934　　　5 Sheets-Sheet 5

INVENTOR
ROLAND CHILTON
BY
ATTORNEY

Patented May 11, 1937

2,079,679

UNITED STATES PATENT OFFICE 2,079,679

TRANSMISSION

Roland Chilton, Ridgewood, N. J.

Application May 29, 1934, Serial No. 728,058

40 Claims. (Cl. 74—281)

This invention relates to transmission mechanism for progressively varying the speed ratio between driving and driven rotary shafts, and in certain respects comprises improvements on my co-pending application Serial No. 669,144.

The transmission of this invention is of the type wherein driving members are loaded in rolling contact against slippage under the driving load. In such constructions hardened rollers working under lubricated conditions are used and the contact pressures required to prevent slippage are relatively high.

One object of the invention is to provide a construction wherein the contact pressures are balanced between the various driving members without the use of heavily loaded bearings which have detracted from the efficiency of certain transmissions in the prior art.

The specific embodiment of the drawings shows a transmission suited to automotive uses wherein it is desired to smoothly accelerate the driven shaft from zero speed up to unitary speed with the driving means, and the transmission of this invention further provides for reverse and overspeed ratios.

The preferred embodiment of this invention employs a slight rocking action between relatively crowned rolling contact driving members to change the relative driving radii thereof, and thus change the speed ratio, and a further object is to provide improved control means whereby this rocking action may be effected with little effort while maintaining the desired contact loads upon the driving members.

An associated object is so far to reduce the effort needed to change the speed ratios that this may be effected by manual means while the parts are under maximum contact and driving loads.

A further object is to provide automatic means which may be used alternately to the manual means for changing the ratio in accordance with the requirements, and independently of any manipulation by the operator. In the specific showing of the drawings the ratio is automatically changed responsively to the speed of the driving means.

A still further object is to provide such automatic control wherein the ratio change characteristics are subject to adjustment at the will of the operator, so that he may set the automatic device to produce a fast or slow rate of ratio change with respect to the speed of one of the driving members (the engine in the case of the automobile application illustrated in the drawings).

Another object is to incorporate in a progressively variable transmission an over-running or "free wheeling" action which may be suppressed at the will of the operator to a positive drive under over-run whereby the engine may be used as a brake when desired.

Other objects will be obvious from, or will be pointed out, in the following description of the specific embodiment of the drawings, wherein.

Segment (A) is a fragmentary section on the line 3—3 of Fig. 1.

Segment (B) is a fragmentary section on the line 4—4 of Fig. 1.

Segment (C) is a fragmentary section on the line 5—5 of Fig. 1.

Segment (D) is a fragmentary end view showing the back of one of the driven members.

Figure 5:
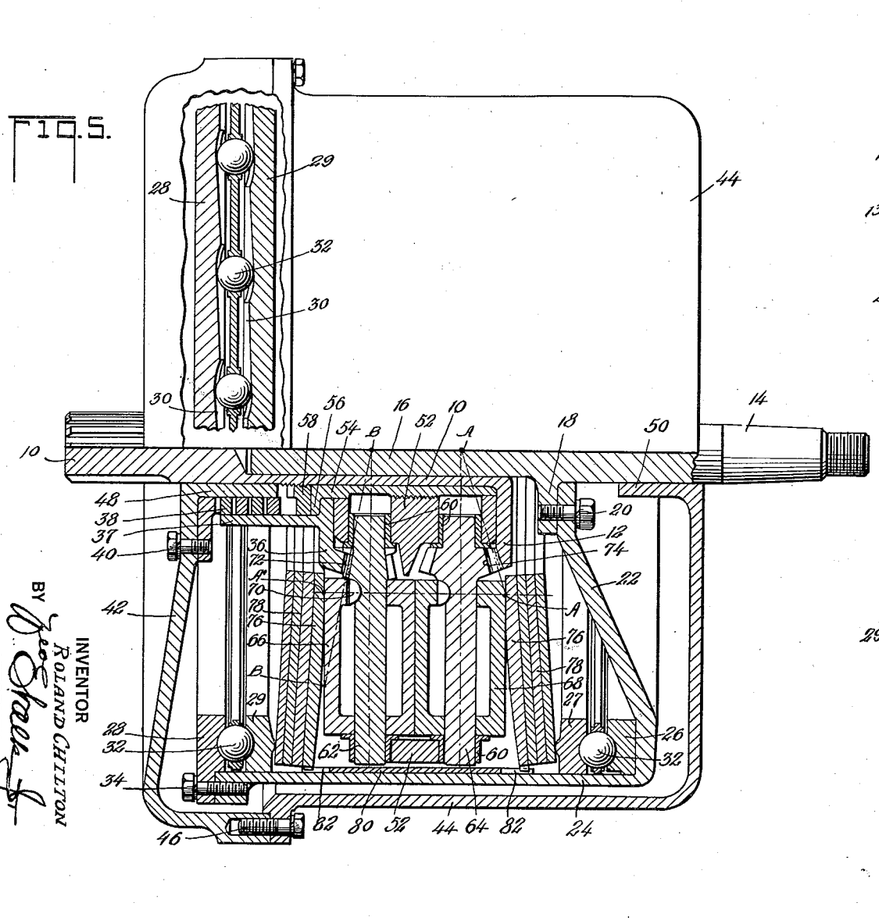
Fig. 5 is a side view of a simplified embodiment, the bottom half being shown in axial section while a sectional development of a portion of a torque responsive device is inserted in the upper half.

Referring first to Fig. 5, 10 designates a driving shaft at the interior end of which is a bevel gear 12, shown as integral. A driven shaft 14 extends at 16 into the hollow portion of the drive shaft 10 to provide a rotationally free pilot bearing. Secured to a driven shaft flange 18, as by bolts 20, is an end plate 22 of a driven drum 24, which carries at opposite ends torque responsive devices comprising companion race members 26, 27 and 28, 29, each provided with inclined tracks 30 separated by balls 32; the race member 28 being secured to the drum 24 by screws 34.

A reaction bevel gear 36 has a cylindrical extension 37 held against backward rotation by a coil 38 anchored by bolts 40. The housing consists of members 42, 44, secured together by bolts 46 and provided respectively with bearings 48—50.

A suitable cage member or planet carrier shown in section at 52 is mounted for free rotation upon the shaft 10 on a bushing 54 which is provided with a flange 56 whereby the normally fixed bevel gear 36 is located axially. A thrust nut 58 in turn locates the cage 52 axially upon the shaft 10. Rotatably mounted in bearings 60 in the cage 52 are a number of radial shafts 62, 64 which respectively carry similar rollers 66, 68; the shafts and rollers being keyed for unitary rotation as indicated at 70. The spacing of the shaft bearings 60 is such that the rollers 66, 68, are in rolling contact.

Formed on the shaft 62 of the roller 66 is a small bevel pinion 72 meshed with the normally fixed reaction gear 36, and formed on the shaft 64 of the roller 68 is a larger bevel pinion 74 engaged with the bevel gear 12 of the drive shaft 10.

Similar driven members 76 comprising annular discs having crowned contact faces are engaged on the outer sides of the rollers 66, 68. In this simplified showing the crowned discs are backed up by a plurality of dished springs 78 which are supported at their outer peripheries by the races 27, 29, of the torque responsive devices already described. The driven members 76 are rotationally connected by a sleeve 80, within the driven drum 24, provided with end splines 82 engaging splines cut in the periphery of the driven members 76.

The desired initial contact load for the one to one ratio position in which the parts are shown is provided by the pre-setting of the plate springs 78, the assembly being pulled up by the bolts 34 so that the contact between the driven members 76 and the rollers 66, 68, falls on the line A—A, which is the pitch cone line of the driving shaft bevel gear 12 and of the mating pinion 74 of the roller 68. The two discs 76 being of identical geometrical form and being subject to equal and opposite contact forces will contact their respective rollers on the same pitch cone angles, i. e., at the same radius from the main axis. The rollers 66, 68, are constrained to equal peripheral velocity by their mutual rolling contact wherefore any point A on the roller 68 has at any instant the same velocity as the complementary point A' on the roller 66.

When the contact of the rollers with the driven discs is on the pitch cone line of the driving bevel gear 12 as shown, then the driven discs 76 are constrained to unitary rotation with the driving gear 12. This unitary speed ratio applies independently of the planetary rotation of the cage 52 which in other ratios will planetize backwards with respect to the driving shaft 10. However, in one to one ratio, the reaction member in any transmission is necessarily relieved of torque reaction and it is the function of the anchoring coil 38 to permit the reaction gear 36 to then rotate forwardly at unitary speed with the other members when this one to one ratio position is in force. This automatically affords a "direct drive in high" wherein there is no relative movement at the rolling or tooth contacts.

As the load on the driven shaft 14 is increased, increasing axial reactions are set up by the sloping tracks 30 of the torque responsive devices which will cause the races 27, 29, to move inwardly against the pressure of the disc springs 78. This action will flatten out the driven discs 76, rocking their crowned contact faces along the rollers 66, 68, thus moving the contact points outwardly.

The line B—B is a continuation of the pitch cone of the reaction bevel gear 36 and pinion 72; this line intersecting the surface of the roller 66 towards its outer end. When the contact of the driven members is transferred to the radius of this intersection then the driven members are restrained to unitary rotation with the normally fixed reaction gear 36, i. e., there will be no motion of the driven shaft regardless of the speed of the driving shaft or of the planet cage 52; the driving ratio being one to zero.

This simplified embodiment just described is suited to any application where it is desired to automatically reduce the speed in proportion to the resistance encountered by the driven member. Such a simplified construction, however, is incapable of resisting over-running of the driven member. In popular terms it is always in "freewheeling". This is on account of the one-way anchorage of the reaction gear 36 whereby the "direct drive in high" is automatically obtained, and also due to the uni-directional construction of the torque responsive devices which are incapable of transmitting reverse torque. Further, the ratio cannot be varied at the will of an operator, nor is the relationship between the driven torque and the gear ratio adjustable except by substituting spring discs 78 of changed elastic properties. These limitations are all met in the construction of the more elaborate preferred showing now to be described. In this latter connection description parts corresponding to those already described in the simplified embodiment will be, insofar as is practicable, identified by numerals 100 higher than those already used.

Figure 1:
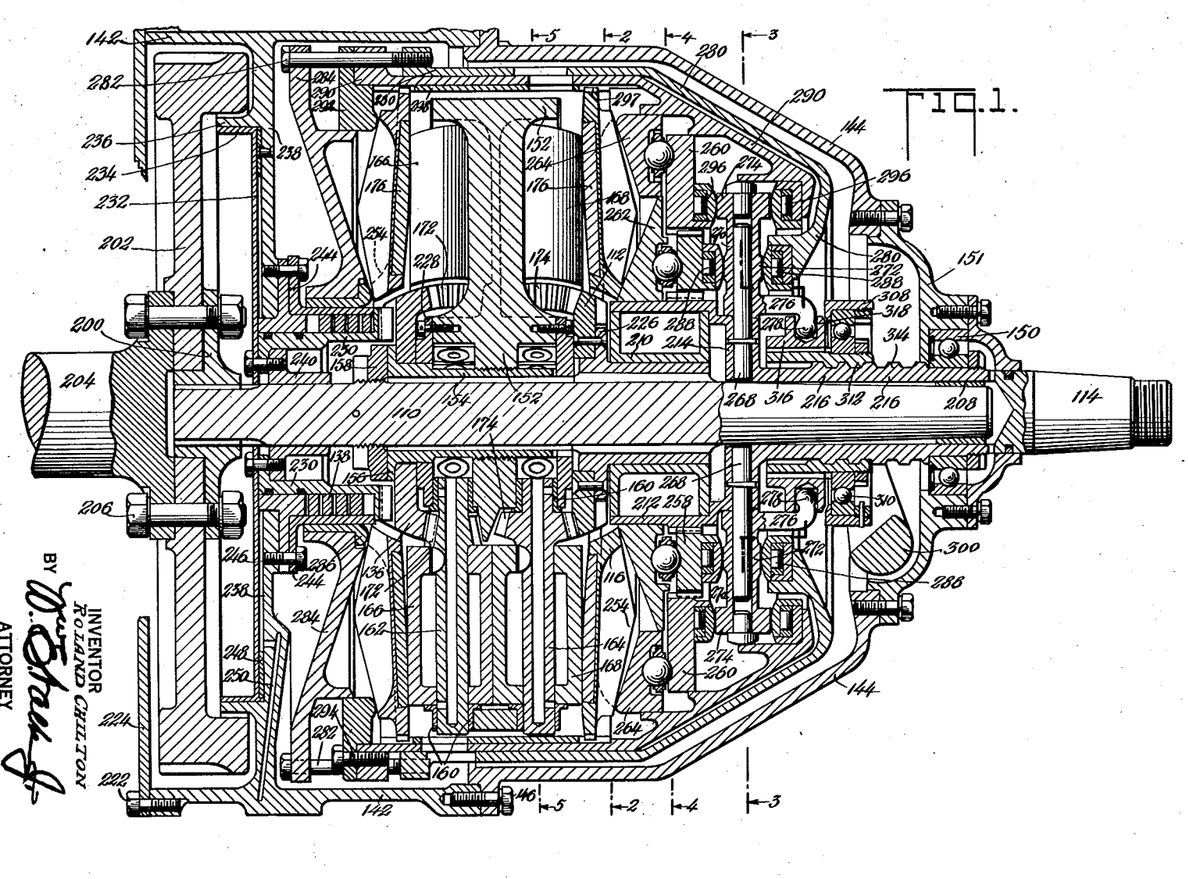
Fig. 1 is a longitudinal axial section on the line 1—1 of Fig. 3.

Referring first to Fig. 1, the driving shaft 110 is shown as splined into a driving hub 200 secured to a conventional automobile fly-wheel 202 and crankshaft 204 by bolts 206. The driven shaft 114 is freely journaled over the right hand end of the driving shaft 110 on bushings 208 and 210. The latter bushing is forced into a large cylindrical extension 212 connected by the integral wall 214 to the smaller tubular portion 216 of the driven shaft which is supported in the bearing 150 in the rear cover 151. The main housings 144 and 142 are secured together by bolts 146; the studs 222 securing the housing 142 to the motor end plate 224.

Figure 4:
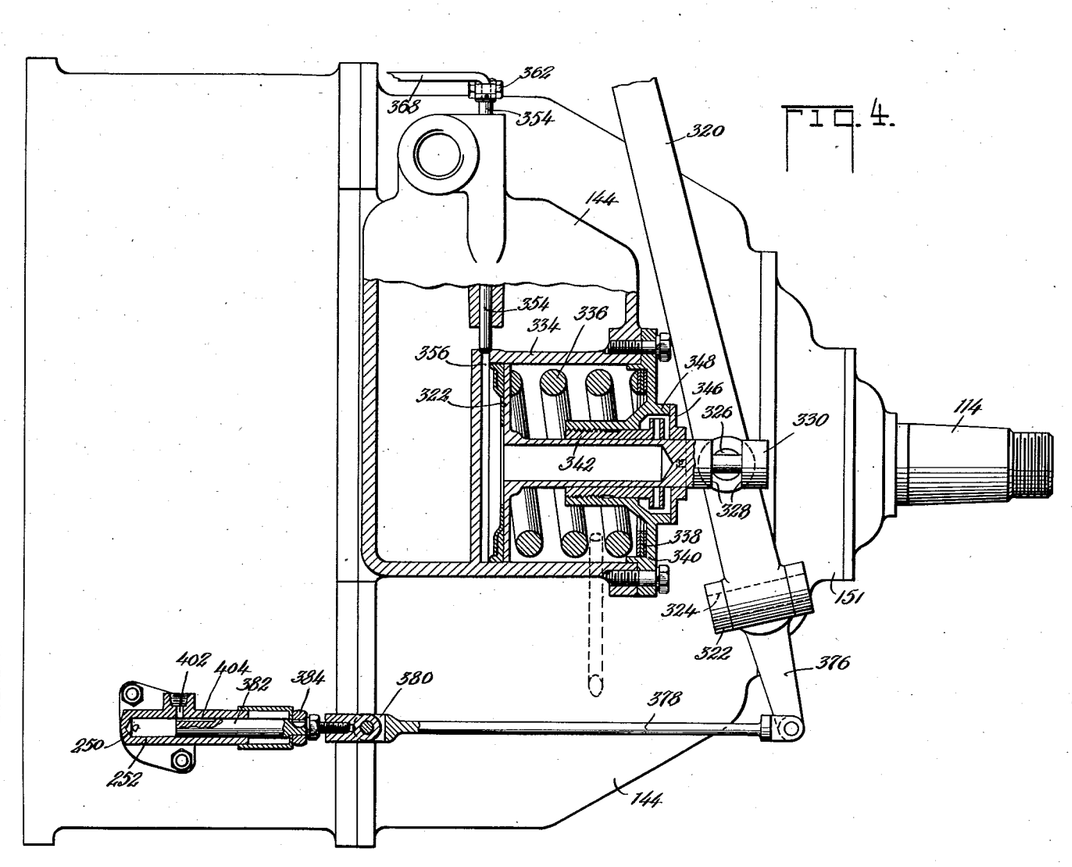
Fig. 4 is a side view with the automatic control cylinder and the fixed member clutch control valve shown in axial section.

Formed integral with the driving shaft 110 is a flange 226 to which is secured the driving bevel gear 112. The normally fixed or reaction gear is shown at 136 and is rotationally mounted around the shaft 110 by the thrust washer 228 and the flange 156 of the bushing 154 screwed into the cage 152 with which bushing the cage is free to rotate upon the shaft 110; the assembly being restrained from axial movement by the thrust nut 158. Mounted in suitable bushings 160 in the planet cage 152 are the shafts 162, 164, rigidly carrying the similar rollers 166, 168, which are in mutual rolling contact as shown. The shaft 162 carries the small bevel pinion 172 meshed with the reaction gear 136 and the shaft 164 carries the larger bevel pinion 174 meshed with the driving bevel gear 112. The reaction gear 136 is end-splined to the anchor member 230 to which is secured the clutch disc 232 which has a piston fit at 234 in a cylindrical extension 236 in the back wall 238 of the housing 142. The bushing 240 is also secured to the anchor member 230 to centralize the assembly upon the drive shaft 110. The one way anchor coil 138 and the fixed bushing 244 are secured in the housing wall 238 as by bolts 246. A friction clutch facing 248 is secured to the housing wall 238 which is provided with the drill passage 250 which communicates with a manifold vacuum control cylinder 252 (later to be further described) seen in the lower left hand corner of Fig. 4.

Figure 2:
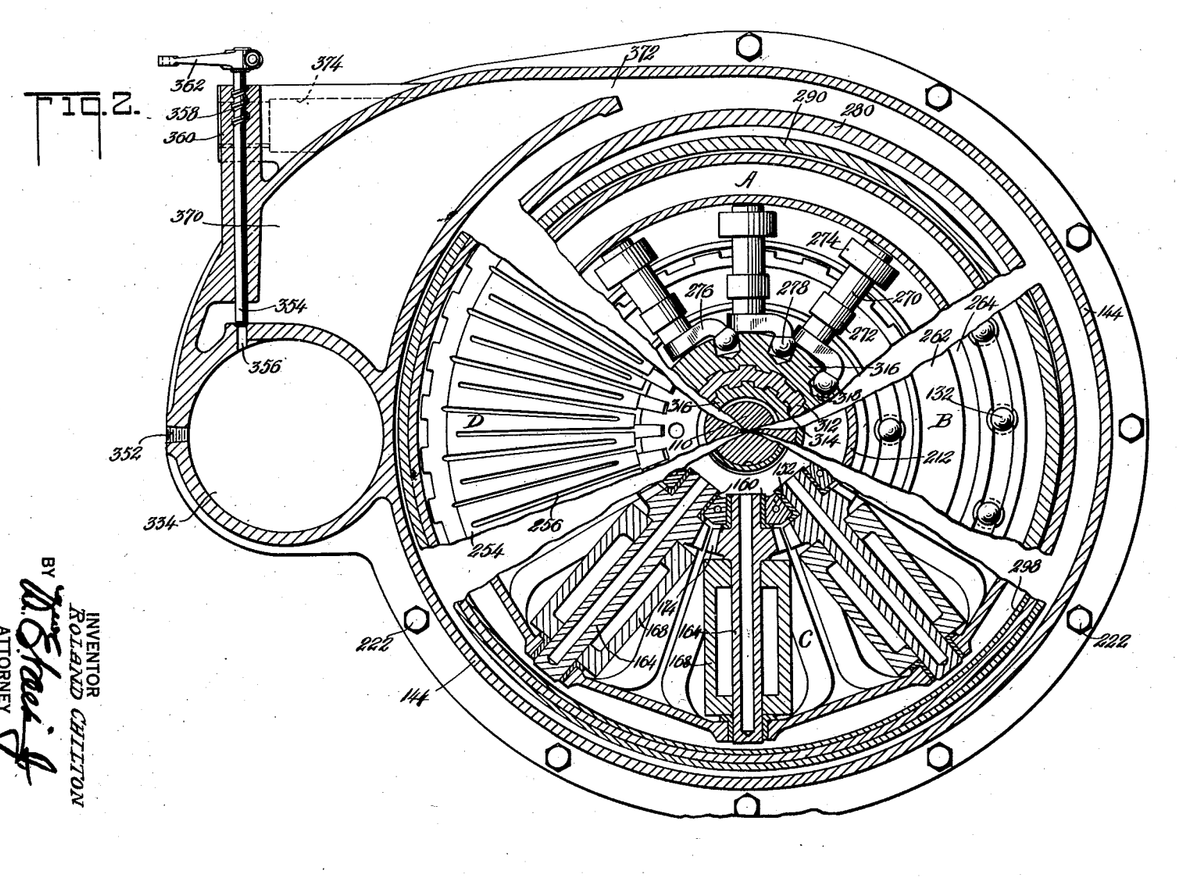
Fig. 2 is a transverse section through the housing on the line 2—2 of Fig. 1 with the internal mechanism shown in various fragmentary segmental sections as follows.
Figure 6:
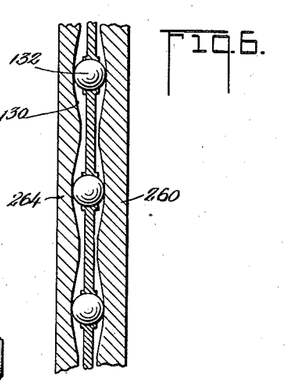
Fig. 6 is a fragmentary development of a torque responsive device.

The driven member assembly which rotates at unitary speed with the driven shaft 114 will now be described. The distortable crowned faced annular driven discs 176 are set into heavy carrier members 254 which are divided into a large number of segments by the slots 256 (see Fig. 2D). These segments while individually rigid comprise collectively thick but distortable support members for the driven discs 176. Splined to the large cylindrical extension 212 of the driven shaft is an inner torque responsive driving member 258 which is in turn splined to an outer torque responsive member 260; these members being free for relative axial movement on the driven shaft 114 and comprising the means by which the driving torque is transmitted to that shaft from the driven discs 176 through the companion members 262, 264, which respectively engage the inner and outer peripheries of the rear driven disc carrier 254. The torque responsive members 258, 260, 262, 264, have double opposed sloping tracks 130 (Fig. 6) engaged by the balls 132 whereby the gross contact load applied to the discs 176 is always proportional to the driving load on the mechanism and sufficiently in excess thereof to prevent slippage.

Extending from radial holes in the wall 214 of the driven shaft are the cam spindles 268 which rotationally support cam sleeves 270 provided with inner cams 272 and outer cams 274 and arms 276 terminating in the balls 278.

The contact loads generated by the inner torque responsive device 262, 132, and 258, are transmitted through the inner cams 272 to the outer drum 280 and thence through the bolts 282 to the end plate 284 to the inner periphery of the companion driven plate 176 by the carrier member 254 through the head of the bushing 286 which runs upon the fixed bearing sleeve 244. Anti-friction thrust rings 288 are interposed between the cams 272 and the outer drum 280 and the torque responsive device 258.

Similarly, the thrust reactions from the outer torque responsive device 260, 264, 132, are transferred through the inner drum 290, and the thrust ring 292 secured thereto by bolts 294 to the outer periphery of the companion driven plate 176 and carrier member 254; anti-friction rings 296 being interposed between the outer cams 274 and the actuated members 260, 290.

The two driven member carriers 254 are splined on their outer peripheries at 297 to engage end splines on the floating sleeve 298 whereby the driven discs 176 are free for flexure to rock their crowned faces to shift the contact along the rollers 166, 168, but are restrained to unitary rotation with each other, and are also free for the slight rotation relative to the inner drum 290 developed at the torque responsive devices due to the slight elastic yield of the parts under increasing loads.

Figure 7:
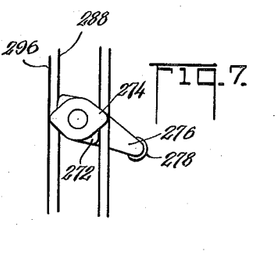
Fig. 7 is a detail end view of the control cam member.

It should be understood that the driving loads are transmitted through the splines between the torque responsive members 260, 258, and the driven shaft extension 212; the control cams 272, 274, being relieved of all driving loads by the anti-friction thrust rings 296, 288. These cams, however, are subject to the entire contact pressure reactions, and it is a feature of this invention that the cam profiles are so related that the entire system is in stable equilibrium in all positions. Thus, in the zero ratio position shown, whereat the entire contact load is on the outer cam 274, this cam is in "dead center" position as shown in the detail end view, Fig. 7. The inner cam is then in its most retracted position and is free from contact load which is concentrated on the outer periphery of the driven discs through the outer cam and torque responsive devices. When the cams are moved so that the contact is at the mid-width of the driven member, the cams are in their mid-position, the inner and outer cam lobes making equal angles with the contacted members whereby the equal loads on each produce equilibrium. Accordingly, in all positions the turning moment on each cam is equal and opposite to the turning moment on its integrally formed mate, whereby the control is relieved of reaction from the contact loads. It will be seen that when a crowned face, such as that of the driven discs is rocked from mid-position relative to a contacted member, the approaching end of the rocker moves less than the receding end, and the profiles of the individual cams of each pair are so related as to produce these different rates of motion while maintaining the contact load on the parts. The results thus attained contribute a very definite and important feature of the invention, since, in the absence of this compensating feature, axial separation between the torque-responsive members 258—262 and 260—264 would be engendered and objectionable rotational backlash would occur.

The cams are controlled from a control rock shaft 300 which has arms 302 (Fig. 3) equipped with studs 304 engaging slots 306 formed in a thrust collar 308 carried by a thrust bearing 310 secured on a control sleeve 312 mounted on a quick pitch screw thread 314 upon the driven shaft 114. Splined on the sleeve 312 is a control ring 316 having cylindrical sockets 318 in which are engaged the ball ends 278 of the cam levers 276. Thus, oscillation of the control shaft 300 produces rotation of the control sleeve 312 relative to the driven shaft 114 by the action of the screw threads 314 oscillating the cams 274, 272, and rocking the driven plates 176 to shift their crowned contact across the length of the rollers 166, 168.

The control rock shaft 300 is actuated through a hand lever 320 (Figs. 3 and 4) which is secured in a jaw 322 by a pin 324 for limited lateral motion. Secured in the lever 320 is a pin 326 engaging in a groove 328 formed in the plunger 330 of a piston 332 slidable in a cylinder 334 shown as integral with the main housing 144.

Figure 3:
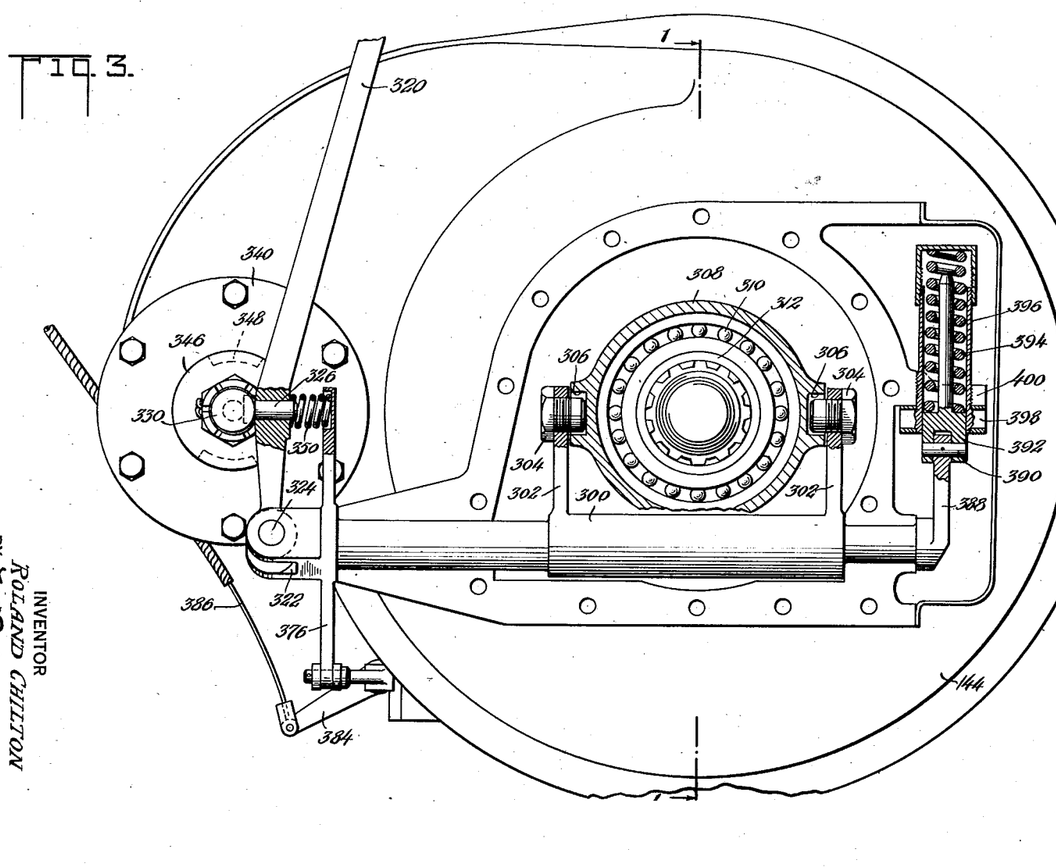
Fig. 3 is an end view with the rear cover removed to show the control shaft with certain of the associated elements in section.

The piston 332 is initially maintained in the left hand position shown by a spring 336 adjustable by shims 338 abutting a cover 340 suitably secured to the housing. The piston 332 is guided by a screwed bushing 342 which serves as an adjustable stop limiting the right hand travel of the piston, while the left hand travel is adjustably limited by a flange nut 346 which abuts a shoulder 348 formed on the cover 340.

It will be seen that by swinging the control lever 320 slightly to the right (Fig. 3), the pin 326 is moved against the action of the spring 350 out of engagement with the groove 328 whereby the ratio may be changed manually and independently of the action of the piston 332.

An oil pump (not shown), driven at speed proportional to the drive shaft 110 (for which purpose the engine lubricating pump may be used) is connected by a suitable pipe (not shown) to the hole 352 (Fig. 2) in the cylinder 334 whereby the piston 332 is subject to oil pressure proportional to the speed of the engine and drive shaft 110. This proportion may be regulated by means of a valve spindle 354 engaging a seat in an escape hole 356 formed in the cylinder 334; the valve spindle having a quick-pitch threaded connection 358 in a boss 360 and being provided with a lever 362 suitably connected, as by the pull rod 368 (Fig. 4), to a control (not shown) placed for convenient setting by the operator. Above the cylinder 334 there is formed an oil reservoir 370 (Fig. 2) communicating with the interior of the housing 144 by a slot 372 so that the action of the rotating drum 280 is to continuously pick up any oil in the housing and return it to the reservoir 370. At the top of this reservoir provision is made at 374 for a return oil connection to the engine oil sump.

Depending from the control rock shaft 300 is a lever 376 connected by a rod 378 and clevis connection 380 to a plunger 382 which is slidable in the cylinder 252 wherein it also has rotational freedom under the control of a lever 384 (Fig. 3) actuated by a control wire 386 which is brought to a position convenient to the operator.

In the right hand side of Fig. 3 will be seen an upturned lever 388 having a pin connection 390 with a plunger 392 loaded by a spring 394 in a cylinder 396 mounted on trunnions 398 in an extension 400 of the main housing. This device comprises a toggle mechanism which exerts a variable torque on the control rock shaft 300 to balance the resistance to elastic deformation of the driven plates 176 whereby the control mechanism or the operator is relieved of effort in distorting these plates in changing the ratio.

From the preceding description of the simplified device of Fig. 5 the mode of operation of the preferred embodiment will now be clear, as follows: As the control lever 320 is moved, either by the operator (in which case the pin 326 is preferably disengaged from its slot 328 in the hydraulic piston plunger 330) or by the plunger 330 during automatic operation with the pin engaged, the control cams 274, 272 are rotated by the action of the cam levers 276 and the spline and screw control mechanism 316, 312, 314, 310, 308 already described, and the inner peripheries of the driven members 176 are moved inwardly through the inner torque responsive device 258, the anti-friction bearings 288, the outer drum 280, and its end plate 284. Simultaneously, the outer cam 274 permits the corresponding approach of the outer anti-friction bearings 296; and through the outer torque responsive device 260, 122, 264, the inner drum 290, and the thrust ring 292, the outer peripheries of the driven discs 176 separate to the required degree. Thus, the contact of the driven plates 176 is transferred gradually from the outer or zero ratio contact position shown to the inner or one to one ratio position, or therebeyond respectively into reverse or over-speed ratios.

From the initial explanation of Fig. 5 it will be understood that the ratio is one to one when the contact of the driven members 176 with the rollers 166, 168, is in line with the pitch cone of the larger or driving bevel gears 112, 174, and that similarly the ratio is one to zero when these contacts are in line with the pitch cone of the reaction bevel gears 136, 172. It will also be obvious that movement beyond zero ratio will give reverse direction to the driven shaft, and that movement within the one to one ratio position will give over-speed drive.

It will also be clear that the hydraulic pressure on the piston 332 from the engine driven oil pump to which it is connected will increase with increasing engine speed, but that the amount of this pressure is controllable by the bleed orifice comprised by the hole 356, and the adjustable spindle 354. When the oil pressure on the piston 332 exceeds the pressure from the spring 336, the piston will move to the right operating the rock shaft 300, and the control cams 272, 274, rocking the driven plates 176 and moving the driving contacts inwardly along the rollers towards a higher driven shaft speed as already described. While this action is automatic, the pressure on the piston 332 is adjustable through the bleed valve spindle 354 by manipulation of which the driver can induce a change in ratio through the hydraulic servo mechanism, and thus he can from time to time modify the automatic characteristics of the mechanism with respect to the relation between the engine speed and the corresponding driving ratio. He can further, as when the engine is at rest, slightly rock the manual lever 320 to disengage its pin 326 from the plunger 330 for simple manual change of ratio.

Reverting now to the small vacuum control cylinder 252 which has already been described as communicating through the hole 250 with the friction clutch 232, it should be noted that this cylinder is provided with a hole 402 through which it is connected by a suitable pipe (not shown) to the intake manifold of the engine. In this way the clutch 232 is subject to manifold vacuum whenever the hole 402 is uncovered by the plunger 382. The vacuum thus exerted on the large area of the disc 232 engages the friction facing 248 thus locking the reaction member 230 and the reaction gear 136 against movement. This gear is at all times restrained against reversed rotation under the reaction torque to which it is subject when the engine is driving the driven shaft forwardly by the anchor coil 138, which by itself would permit the reaction gear 136 to travel forwardly whenever reversed torque was put on the mechanism. In other words, but for the vacuum operated clutch 232 the transmission would always be "in free wheeling". However, it will be seen that whenever the control lever 320 is moved beyond the zero ratio position shown, the manifold vacuum control plunger 382 will move to the right of Fig. 4 and uncover the hole 402, thus automatically locking the fixed gear 136 through the clutch 232 whenever the mechanism is put into reverse ratios.

A longitudinal slot 404 is provided in the plunger 382 as shown, and when the plunger is so rotationally held through the lever 384 and control wire 386 that the slot 404 is opposite to the hole 402, manifold vacuum is maintained on the clutch 232 in spite of the longitudinal movement of the plunger 382 from the control lever extension 376, until the end of the slot 404 covers the hole 402. This is arranged to occur as the mechanism reaches the one to one position whereby the clutch 232 is relieved of manifold vacuum and the fixed gear 136 is free to rotate forwardly with the rest of the driving mechanism by the one-way action of the locking coil 138, giving direct drive in high.

In short, the plunger 382 is so organized that the clutch 232 is always locked by manifold vacuum in reverse ratios and is never locked in one to one ratio, the intermediate status being determined at the will of the operator through the lever 384' according as the slotted or unslotted portion of the plunger 382 is opposite the hole 402. The transmission is accordingly in "free wheeling" or not at the option of the operator who has, however, no control of the automatic locking of the reaction gear 136 when in reverse or of its freedom for forward rotation when in one to one ratio.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. A transmission including in combination, a driving bevel gear, a reaction bevel gear, planetary pinions having different fixed ratios of driving engagement with respective gears, rollers secured to respective pinions, and driven means engageable with said rollers at variable drive ratios, said rollers being drivably connected together.

2. In a transmission, a pair of opposed members, a pair of radial planetary rollers drivably engaged with each other and with respective members, means cooperating with said members whereby the radii of contact of the rollers upon the members may be symmetrically varied along the rollers, and means mounting said rollers for planetization.

3. In a transmission, a pair of mutually connected radial rollers, mutually opposed disc members having a relatively crowned rolling driving relation with said rollers at opposed points thereon, and rocking means to shift said points symmetrically along the rollers.

4. In a transmission, a pair of planetary rollers drivably contacted one with the other, a pair of opposed members drivably contacting respective rollers and rockable for symmetrical movement of the contact points along said rollers, means cooperating with said members to effect said rocking, and means mounting said rollers for planetization.

5. In a transmission, a pair of elongate planetary rollers drivably connected together, a pair of rockable members opposed to each other in rockable rolling driving contact with respective rollers at similar but variable distances therealong, means cooperating with said members to effect said rocking without disturbing said similarity, and means mounting said rollers for planetization.

6. In a transmission, a pair of planet rollers drivably engaged one with the other, opposed members selectively drivably engageable with any opposite points along the length of respective rollers by rocking relation thereto, means connecting said members against relative rotation, and means cooperating with said members to effect said rocking.

7. In a transmission, in combination, a bevel gear and a roller on intersecting axes, said roller having an extended working profile intersecting the pitch cone of said gear, a pinion secured for rotation with the roller and meshed with said gear, a disc concentric with the gear and in rolling driving contact with the roller, said disc being rockable for contact shift along said roller profile whereby said contact subtends various pitch cone angles including that of the gear whereat the gear and disc have unitary rotation, and means cooperating with said disc to effect said rocking contact shift.

8. In a transmission, in combination, a roller, members having respectively fixed and variable pitch cone angle driving connections with the roller, the connections comprising respectively bevel gears and a rockable driving contact of one of said members on the roller whereby said members have unitary speed ratio when the rockable contact is brought to the same pitch cone angle as that of the bevel gears and different ratios as the pitch cone angle relationship is varied, and means cooperating with said disc to effect said rocking.

9. In a transmission, in combination, a roller having a substantially cylindrical working profile, a bevel pinion rigid with the roller and having a pitch cone of such angle as to permanently intersect said profile, a bevel gear meshed with said pinion, a disc having roller driving contact rockable along said profile to and from said intersection, and means cooperating with said disc to effect said rocking.

10. In a transmission, in combination, a pair of mutually contacted rollers having working profiles whereof the axial length exceeds the diameter, a pair of discs rockably contacted with respective rollers for contact shift along the length thereof, and means cooperating with said discs to effect said rocking.

11. In a transmission, in combination, a bevel gear and a pinion of given pitch cone angle, a roller member rotationally fixed to the pinion and having a working profile intersecting said pitch cone, a disc member engageable with the roller member at said intersection and elsewhere along said profile by relative rocking thereon, and means cooperating with one of said members to effect said rocking.

12. A transmission including, in combination, a pair of assemblages each comprising a roller member and a disc member having contact surfaces relatively curved for rocking contact one with the other, the radius of said curvature being many times the radius of the roller member whereby a slight angle of rocking produces a relatively great contact shift along the roller member, the roller members of respective assemblages being drivably connected one with another for reverse relative rotation, and means cooperating with one of said members to effect said rocking.

13. In a transmission, in combination, a pair of roller members in rolling driving contact with each other, a pair of disc members in rolling driving contact with respective roller members, the contacting profiles being rockered for simultaneous co-directional contact shift along each roller member, and means cooperating with one of said members to effect said rocking.

14. In a transmission, in combination, a pair of mutually contacting rollers, a pair of discs individually rockably contacted with respective rollers for equal and simultaneous shift of each contact radially of the axis of the discs, and means cooperating with said discs to effect the simultaneous rocking shift.

15. In a transmission, in combination, a pair of mutually contacting roller members, a pair of disc members in opposed individual contact with respective roller members, said contacts being rockable to various zones on the roller members and disc members whereof any one roller member zone can contact only with one disc member zone, and means cooperating with corresponding members to effect such variation in the zones of contact.

16. In a transmission, in combination, a pair of roller members and a pair of disc members rockably contacted, one roller member with one disc member, and the other roller member with the other disc member, for rolling driving contact and for rocking contact shift action without sliding of one contacting surface over the other even though said rolling be suppressed, and means cooperating with one pair of members to effect said rocking contact shift.

17. In a transmission, in combination, a roller member and a disc member on each side of a plane of symmetry, said roller members and disc members having convex contact relationships organized for rocking as distinguished from sliding contact shift along the roller members and across the disc members, said roller members being drivably connected together in said plane of symmetry, and means cooperating with corresponding members to effect said rocking contact shift.

18. In a transmission, in combination, two assemblages opposed to each other and each comprising a roller member and an annular disc member having radially coextensive rolling driving contact profiles rockably related one to the other for equal and simultaneous radial contact shift along said roller member profiles and across said disc member profiles, and means cooperating with one member of each assemblage to effect said rocking contact shift.

19. In a transmission, in combination, a first annular disc, a first roller radial of the disc and rockably contacted therewith for equal radial contact shift along the roller and across the disc, a similarly arranged disc and roller, said rollers being drivably connected one with the other, and means cooperating with said discs to effect said rocking contact shift.

20. In a transmission, in combination, a pair of rollers in mutual driving contact, discs having opposed rockered contacts with respective rollers and distortable for shift of said contacts along the rollers whilst maintaining said opposition of the respective disc contacts, and means cooperating with said discs to distort said discs to effect said rocking contact shift.

21. In a transmission, in combination, rollers in paired mutual driving contact, discs opposed to each other in rocking contact relation with respective rollers and distortable for contact shift therealong, and means cooperating with said discs to distort said discs to effect said rocking contact shift.

22. In a variable speed drive, in combination, a disc, a roller radial of the disc and engaged therewith for rocking contact shift along the roller, a bevel gear coaxial with the disc and rotatable relatively thereto, a bevel pinion meshing with the gear and organized for unitary rotation with the roller, a balanced contact loading means including a second disc oppositely tied to the first said disc, a roller interposed between the second said disc and the first said roller, and means cooperating with said discs to effect said rocking.

23. A variable speed planetary drive including, in combination, a roller and a bevel pinion comprising a planetary member, a bevel gear member meshed with said pinion, a disc rockably related with the roller for contact shift therealong, means mounting said planetary member for planetization, and means cooperating with said disc to effect said rocking contact shift.

24. In a transmission, in combination, a roller member and a bevel pinion organized for unitary planetization about an axis, a coaxial disc member drivably contactable at various points along the roller member, a coaxial bevel gear engaged with the pinion, and rocking means cooperating with one of said members to effect said variation.

25. In a transmission, in combination, a roller and a bevel pinion organized for unitary planetization about an axis, a coaxial disc drivably contactable at various points along the roller, a coaxial bevel gear engaged with the pinion, means to load said contact including a second roller and disc opposed to the first said roller and disc, said rollers being in driving connection one with the other, and rocking means cooperating with said discs to effect said variation.

26. In a transmission, in combination, a planet member comprising a bevel pinion and a roller, a bevel gear and a disc drivably engaging the pinion and roller respectively of said planet member at fixed and rockably shiftable pitch cone angles respectively, and means cooperating with said disc to effect said rocking shift.

27. In a transmission, in combination, a planet member comprising a bevel pinion and a roller, a bevel gear and a disc drivably engaging the pinion and roller respectively of said planet member at fixed and rockably shiftable pitch cone angles respectively, means cooperating with said disc to effect said rocking whilst maintaining contact load on the roller and disc engagement, and means cooperating with said disc adapted to exert said contact load.

28. In a transmission, two members rockably contacted, means urged to separation and cooperating with one of said members to load said contact, and load transmitting cam means cooperating with one of said members, said cam means being operable to effect said rocking and at the same time prevent said separation.

29. In a transmission, in combination, opposed members, means restraining said members against relative rotation, rollers having a rocking driving contact relationship with said members, means to load said contacts, and cam means cooperating with said members profiled and organized to effect said rocking whilst transmitting the contact loads.

30. In a transmission, in combination, arcuate rocker members, cam means effective at respective margins of said rocker members organized to rock said rocker members and at the same time compensate for the inequality characteristic of the rocking of arcuate members, and means operatively connecting said rocker members to said cam means.

31. A transmission comprising, in combination, two driving units each including a roller and a disc having contacting profiles one of which is rectilinear and the other of which is convex, said discs and rollers being rockably related and said rollers being in mutual driving contact one with the other, means cooperating with said discs to effect said rocking, shafts, and means including said units drivably connecting said shafts.

32. In a transmission, in combination, a pair of disc members, means connecting said disc members against relative rotation, mutually contacting roller members in rocking contact relation with the disc members, and means cooperating with certain of said members to effect said rocking.

33. A transmission including, in combination, two assemblages each comprising a disc member and a plurality of roller members rockably contacted for coplanar contact shift, the roller members of one assemblage being in driving contact with those of the other, and means cooperating with the corresponding members of each assemblage to effect said rocking contact shift.

34. In a transmission, in combination, elongate rollers having paired driving contact with each other subtending said elongation, discs contacting respective rollers, and means cooperating with said discs to effect a contact shift of said discs along the rollers.

35. In a transmission, in combination, a roller member and an annular disc member rockably contacted for contact shift along the roller member and across the disc member, means cooperating with one of said members to effect said rocking, a second disc member, means to hold said second disc member against rotation relatively to the first disc member, and a second roller member drivably connecting the first said roller member and the second said disc member.

36. In a transmission, the combination with a disc member, of a pair of axially parallel drivably connected roller members radial of the disc member axis, said disc member and roller members being rockably related for contact shift along at least one of said roller members, bevel gear means drivably associated with said roller members, and means cooperating with one of said members to effect said rocking.

37. In a transmission, two sets of radially elongate rollers, said sets of rollers being drivably connected together, at or near the roller ends, a shaft, bevel gears drivably connecting said shaft to certain of said rollers, and means mounting said rollers for planetization about the axis of said shaft.

38. In a transmission, in combination, an annular disc member, a plurality of roller members axially radial of the disc member and rockably contactible radially of the face of said disc member, means cooperating with one of said members to effect said rocking, and bevel gears drivably related to said roller members.

39. In a transmission, in combination, a roller and an annular member profiled for rocking contact with said roller, means cooperating with said member to distort said member for rocking action, said member being rigid against any profile change, and a bevel gear and pinion drivably related to said roller.

40. In a transmission, in combination, a disc, a plurality of elongate rollers organized for contact with and planetization about the axis of said disc, means mounting said rollers for planetization about said axis, means operable to effect rectilinear movement of the contact points lengthwise said rollers by axially distorting said disc, and a bevel gear and pinion drivably related to said rollers.

ROLAND CHILTON.